United States Patent
Hammes et al.

(10) Patent No.: US 9,369,225 B2
(45) Date of Patent: Jun. 14, 2016

(54) DISTRIBUTION OF AN ELECTRONIC REFERENCE CLOCK SIGNAL THAT INCLUDES DELAY AND VALIDITY INFORMATION

(71) Applicant: Intel Mobile Communications GmbH, Neubiberg (DE)

(72) Inventors: Markus Hammes, Dinslaken (DE); Christoph Schultz, Essen (DE); Edoardo Valori, Duesseldorf (DE); Michael Wilhelm, Mammendorf (DE); Junlin Yan, Duesseldorf (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 716 days.

(21) Appl. No.: 13/632,230

(22) Filed: Oct. 1, 2012

(65) Prior Publication Data

US 2014/0094218 A1    Apr. 3, 2014

(51) Int. Cl.
| | |
|---|---|
| H04B 1/16 | (2006.01) |
| H04J 3/06 | (2006.01) |
| H04B 1/04 | (2006.01) |
| H04B 1/00 | (2006.01) |

(52) U.S. Cl.
CPC ............ *H04J 3/0685* (2013.01); *H04B 1/0082* (2013.01); *H04B 1/04* (2013.01); *H04B 1/16* (2013.01); *H04B 2001/0491* (2013.01)

(58) Field of Classification Search
None
See application file for complete search history.

(56) References Cited

U.S. PATENT DOCUMENTS

| 6,630,872 B1* | 10/2003 | Lanoue | H03L 1/022 |
|---|---|---|---|
| | | | 331/158 |
| 2007/0205939 A1* | 9/2007 | Bae | 342/357.02 |
| 2009/0088085 A1* | 4/2009 | Nilsson et al. | 455/76 |
| 2009/0231188 A1* | 9/2009 | Yanni et al. | 342/357.06 |
| 2010/0069085 A1 | 3/2010 | Hammes et al. | |
| 2010/0330931 A1* | 12/2010 | Uehara et al. | 455/75 |
| 2012/0223858 A1* | 9/2012 | Abraham et al. | 342/357.62 |
| 2013/0040583 A1* | 2/2013 | Kim et al. | 455/84 |

OTHER PUBLICATIONS

Office Action received for CN Patent Application No. 201310511898.4, dated Dec. 1, 2015, 7 pages of Office Action and 12 pages of English translation.

* cited by examiner

*Primary Examiner* — Philip Sobutka

(57) ABSTRACT

An integrated circuit has a clock subsystem, and a circuit. The clock subsystem is configured to provide a reference clock signal to a first module and a second module. The circuit is configured to distribute information describing characteristics of the reference clock signal to the second module. The information distributed with the circuit enables the second module to adapt the reference clock signal based on the information.

15 Claims, 4 Drawing Sheets

DISTRIBUTION OF AN ELECTRONIC REFERENCE CLOCK SIGNAL THAT INCLUDES DELAY AND VALIDITY INFORMATION

FIELD OF THE DISCLOSURE

This disclosure relates to electronic clock signaling and, more particularly, to systems and methods for distribution of an electronic clock signal.

BACKGROUND

In the field of electronic, a clock signal is used, like a metronome, to coordinate actions of a circuit. Computer retailers, for instance, often draw attention to the frequency of the clock rate in a given processor in order to advertise the performance of a computer.

Clock signals are also widely used in communication circuits. Many modern mobile communication devices may incorporate multiple communication standards. For instance, many modern mobile telephones include standards such as the Global System for Mobile Communications standard (GSM; also known as 2G), the Universal Mobile Telecommunications System standard (UMTS; also known as 3G), the Global Positioning System standard (GPS), the Institute of Electrical and Electronics Engineers' 802.11 series of standards (sometimes also known as Wi-Fi or WLAN), the Bluetooth standard, and the Long Term Evolution standard (LTE). These various standards may often require unique clocking requirements. Thus clock subsystems are found in various communication standards as function blocks, and may impact overall system costs.

SUMMARY

In an aspect of this disclosure, an integrated circuit has a clock subsystem, and a circuit. The clock subsystem is configured to provide a reference clock signal to a first module and a second module. The circuit is configured to distribute information describing characteristics of the reference clock signal to the second module. The information distributed with the circuit enables the second module to adapt the reference clock signal based on the information.

One or more of the following features may be included. The first module may be a mobile communication standard configured to synchronize to a base station in a mobile communication network. The first module may be driven by a voltage-controlled temperature-compensated crystal oscillator (VCTCXO) grade clock signal and the second module may be configured to be driven by a temperature-compensated crystal oscillator grade clock signal. The second module may include a global navigation satellite system (GNSS) receiver. The information may be generated by the clock subsystem, or may be generated by the first communication module. An algorithm within the second module may continuously adapt the second module based on clock quality provided in the information. The clock subsystem may be integrated into the first module. The clock subsystem may be a separate module.

In an aspect of this disclosure, a method for sharing a clock signal includes distributing a reference clock signal to a first module and standard second module, distributing information to the second module describing characteristics of the reference clock signal, and adapting the reference clock signal with the information to meet clocking requirements of the second module.

One or more of the following features may be included. The method for distributing a shared clock signal between multiple communication standards modules may further include synchronizing the reference clock signal to a base station in a mobile communication network. The reference clock may be generated with an oscillating signal from a voltage-controlled temperature-compensated crystal oscillator (VCTCXO) or a crystal oscillator (XO). The information may include a frequency correction value configured to adjust a digital to analog converter (DAC). Adapting the reference clock signal may include adjusting the digital to analog converter (DAC) with the frequency correction value of the information, and low-pass filtering the reference clock signal with a digital filter. The algorithm within the second module may continuously adapt the second module based on clock quality provided in the information. The reference clock signal may be generated within the first module. The reference clock signal may be generated within separate clock subsystem module.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

Advances in integrated circuit (IC) technology allow for increased integration of multiple communication standards onto a single system. Integration methods include for example, system on chip (SoC) integration, system in package (SiP) integration, and other module integration methods. Such integration in cellular applications, for instance, allows for the possibility of reducing overall system costs by sharing functional blocks between systems implementing various communication standards. A clock subsystem is a functional block needed in implementing various communication standards, and may have a relatively high cost in overall system development. It would be beneficial, therefore, to have a single clock subsystem that serves all communication systems at the same time.

The requirements for clock subsystems, however, generally depends on a given communication standard, and may differ between various communication standards. For standards such as 2G GSM, 3G UMTS, and LTE, it might be desirable, or perhaps even required by the given standard, to synchronize the clock subsystem to a cellular base station. This synchronization allows the spurs generated by the reference clock to be fixed in relation to the received channel.

If the reference clock is synchronized to the base-station for a primary communication standard, and at the same time shared with a secondary communication standard, the reference clock may be artificially degraded for the secondary communication standard. In other words, when the reference clock is synchronized to the base-station for the primary communication standard, such as 2G GSM, and the reference clock is also used for the secondary communication standard, such as WLAN, the performance of the secondary communication standard may be degraded, for example, as a result of synchronizing the reference clock to the base-station of the primary communication standard. Moreover, such limitations may even render some approaches to a single reference clock infeasible in instances where the secondary communication standard may require a more stable reference clock than is afforded with a reference clock that is synchronized to the base-station for a primary communication standard. Co-pending application Ser. No. 12/210,763, Hammes et al., filed on Sep. 15, 2008, the contents of which is hereby incorporated by reference, details a specific method and system for sharing a clock reference signal within an integrated mobile device.

Figure 1:
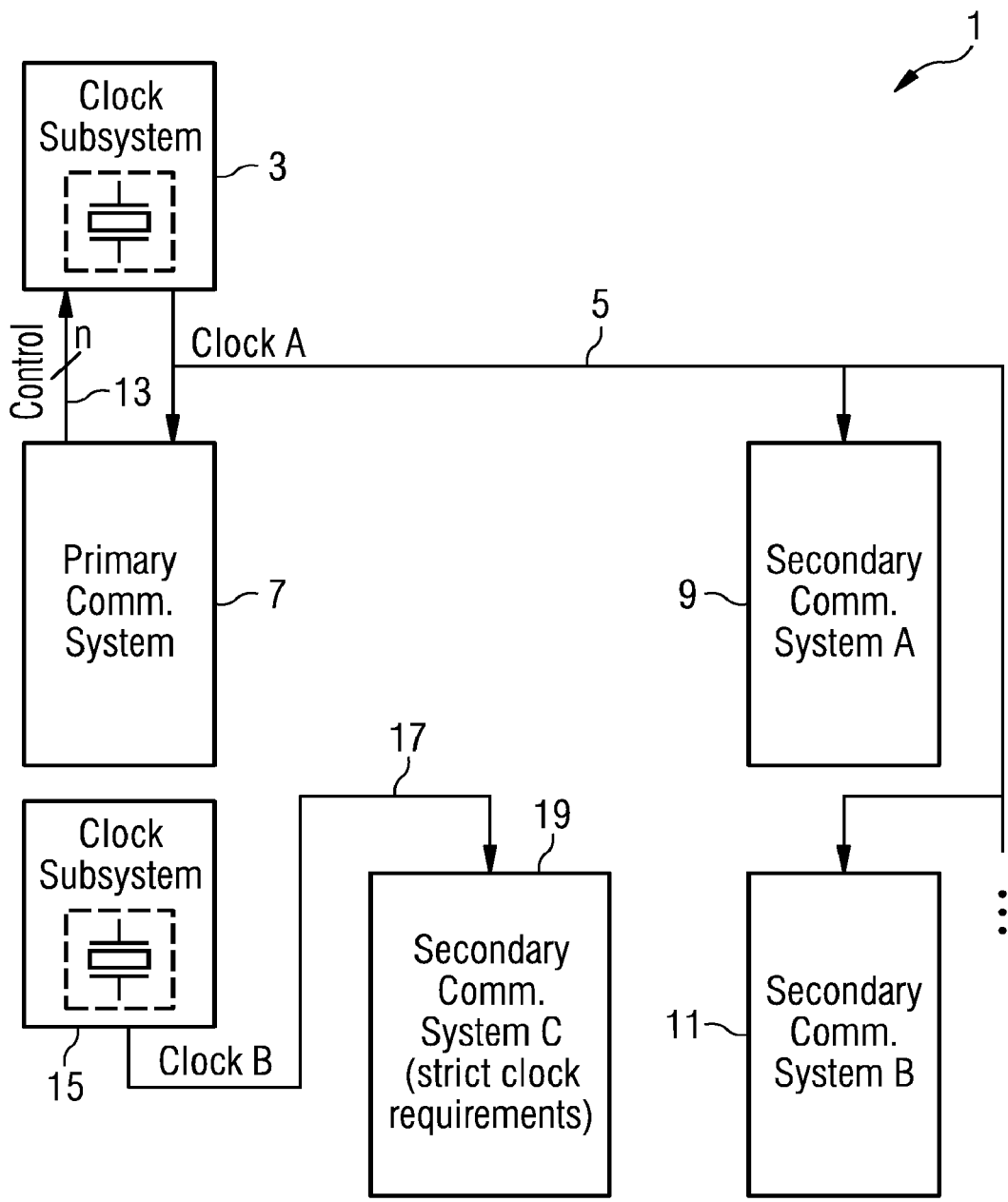
FIG. 1 is a clock distribution system.

FIG. 1 is a clock distribution system. Attempts at sharing a reference clock have generally been limited to select communication standards that have a level of clocking compatibility between one another. For instance, 3G UMTS and Bluetooth have clocking characteristics that have been found to be capable of sharing a reference clock. GPS, on the other hand, requires a more stable reference clock, and thus a second reference clock, employing a temperature-compensated crystal oscillator (TCXO), is usually added to devices that have both 3G UMTS and GPS, for example. A typical system setup is described with reference to FIG. 1. Mobile communication device 1 includes a first clock subsystem 3 that generates clock signal 5 which is distributed to primary communication system 7 and a plurality of secondary communication systems 9, 11. Primary communication system 7 may provide feedback to clock subsystem 3 via control signal 13.

The various communication systems 7, 9, 11, are implementations of various communication standards. As an example, primary communication system 7 may implement the 2G GSM communication standard, while secondary communication systems 9 and 11 may respectively be implementations of Bluetooth and WLAN standards, for example.

Mobile communication device 1 also includes a second clock subsystem 15 that generates clock signal 17 which is distributed to secondary communication system 19 having strict clock requirements. In other words, secondary communication system 19 is an implementation of a communication standard which has strict clock requirements. An example of a communication standard with strict clock requirements is, for instance, GPS. Because a GPS receiver calculates its distance to a given satellite using the transit time of signals sent by the satellite, it is important that the GPS receiver's clock is accurate. It has been estimated, for example, that an error of one microsecond has the potential of causing a UPS receiver's calculations to be off by 980 feet.

Thus while mobile communication device 1 is able to share clock subsystem 3 between several communication systems, such as primary communication system 7 and secondary communication systems 9 and 11, there remains a need for other clock subsystems, and in particular clock subsystem 15, to drive implementations of specific communication standards. This requirement for multiple clock subsystems increases the complexity and cost of mobile communication device 1.

Figure 2:
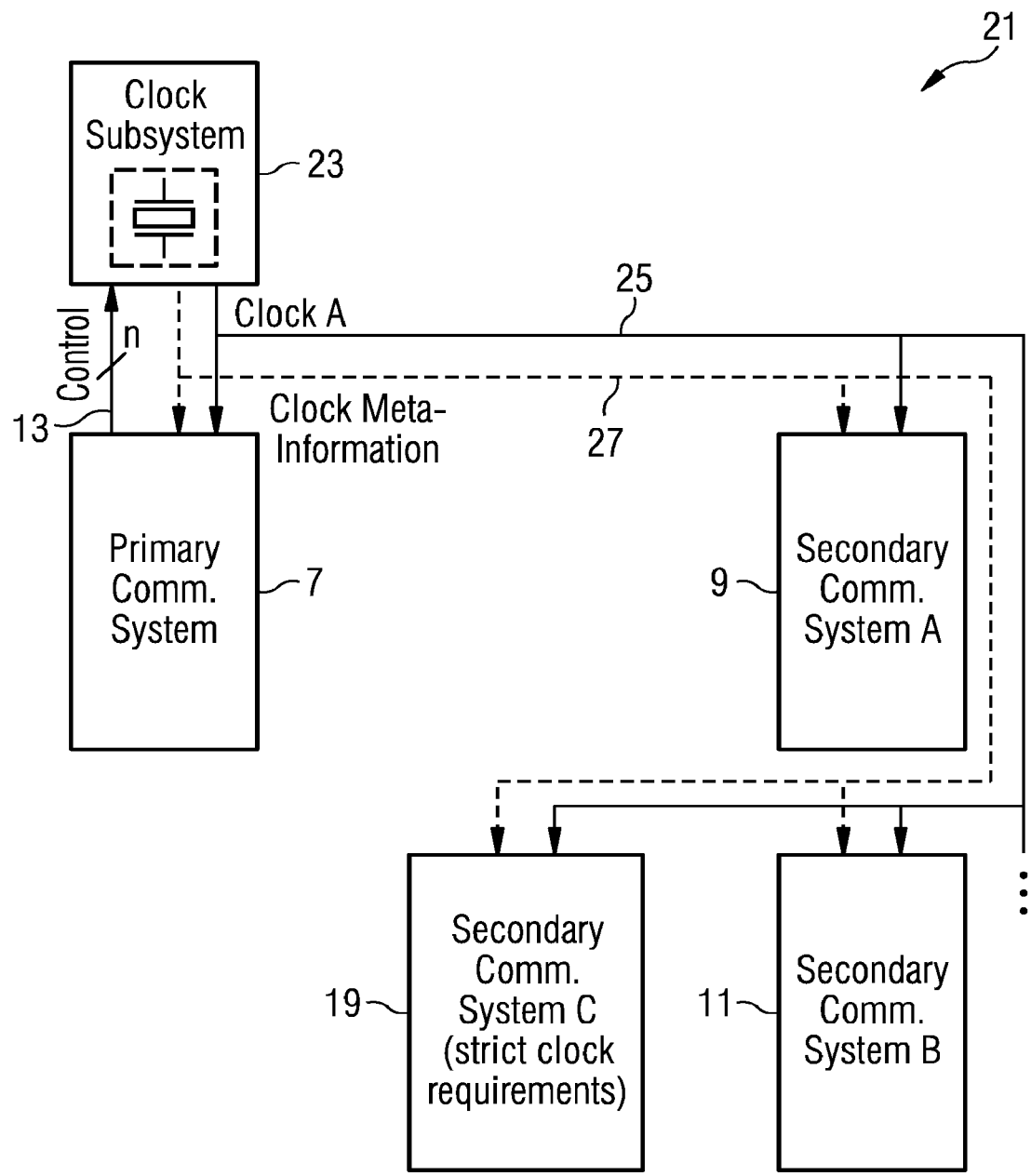
FIG. 2 depicts a sharing of a clock signal, according to an aspect of the invention.

FIG. 2 depicts a sharing of a clock signal, according to an aspect of the invention. As in FIG. 1, mobile communication device 21 includes clock subsystem 23 that generates clock signal 25 which is distributed to primary communication system 7 and a plurality of secondary communication systems 9, 11. In addition, clock signal 25 is distributed to secondary communication system 19 which has strict clock requirements. Thus communication device 21 is able to share clock subsystem 23 between several communication systems including those with strict clock requirements. As a result, the complexity and cost of mobile communication device 21 is reduced.

In order share a single reference clock, such as clock subsystem 23, with all communication systems 7, 9, 11, 19 as shown in FIG. 2, clock information 27 is distributed over a circuit to communication systems 7, 9, 11, 19 in addition to distributing clock signal 25 amongst communication systems 7, 9, 11, 19. This circuit may be implemented, for example, as a dedicated data bus.

Thus an integrated circuit, such as mobile communication device 21 shown in FIG. 2, has clock subsystem 23 configured to provide a reference clock signal 25 to a primary module (primary communication system 7) and at least one secondary module (plurality of secondary communication systems 9, 11), and a circuit which is configured to distribute clock information 27 describing characteristics of the reference clock signal to at least one secondary module. Clock information distributed with the circuit enables at least one secondary module to adapt the reference clock signal based on the clock information.

Since some clocks local to communication systems 7, 9, 11, 19 (local clocks) may be synthesized out of a clock signal 25, this synthesized information can be included as part of clock information 27 and used to cancel out any artificial degradation that may have been introduced, for example, by synchronizing to an external reference. Thus clock information quality is not altered and communication systems 7, 9, 11, 19 do not influence each other.

By sharing a single reference clock, such as clock subsystem 23, with communication systems 7, 9, 11, 19, overall system integration of mobile communication device 21 is simplified, for example, by having fewer spur sources than a traditional multi-clock system.

To ensure that any artificial degradation introduced by sharing a single reference clock is sufficiently cancelled out, clock information 27 may be distributed over a circuit synchronous with clock signal 25. Alternatively, clock information 27 may be time-stamped in order provide temporal relevance. Clock information 27, may additionally be used in selecting proper communication systems algorithms based on a quality metric of clock signal 25. That is, clock information may not only be used to synthesize local clocks, but may be used in a dynamic fashion to select proper communication systems algorithms.

Figure 3:
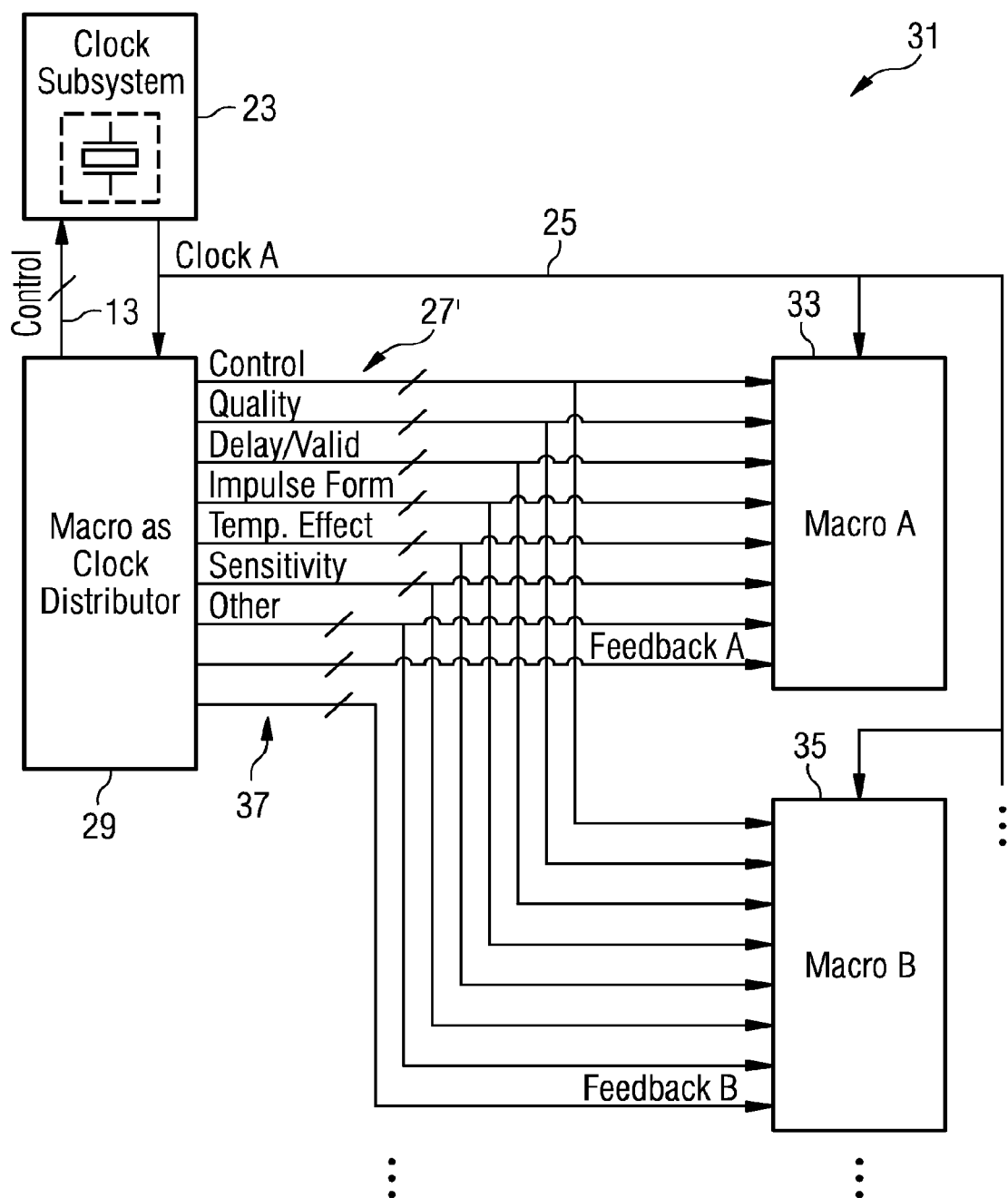
FIG. 3 is a circuit sharing a clock signal detailing an implementation of the information circuit described with reference to FIG. 2, according to an aspect of the invention.

FIG. 3 is a clock distribution system with a clock-information bus detailing an implementation of the meta-channel described with reference to FIG. 2, according to an aspect of the invention. Accordingly, similar to FIG. 2, mobile communication device 31 includes clock subsystem 23 that generates clock signal 25 which is distributed to primary macro 29 and a plurality of secondary macros 33, 35. Clock information 27 may be generated by clock system 23 directly, or may be generated within primary macro 29 which controls clock subsystem 23 via control signal 13. FIG. 3, for instance, shows a detailed implementation of clock information 27' which is generated within primary communication system 7. That is, clock information 27' is a specific implementation of clock information 27 which is generated within macro 29. Macro 29 may include the functionality of primary communication system 7 along with functionality for generating clock information 27'. In other words, macro 29 can be a self-contained macro or can be contained within another macro, such as a cellular macro, for example. Thus the functionality of macro 29 is independent from a specific topology.

Clock information 27' includes control information, quality information, delay and validity information, impulse form information, temperature effect information, sensitivity information, and other information. It is understood that clock information 27' is not limited to the enumerated set of information above, but may include other information relevant for providing adequate clocking mechanisms. With respect to the enumerated set of information above, the terms are understood to mean the following.

Quality information indicates the quality of the signals that are sent to end macros 33 and 35. Delay and validity information indicates when and whether signals sent to end macros 33 and 35 are valid. Impulse form information includes control bits to control how clock subsystem's 23 frequency is filtered and provides specific transition times before a given set of control bits becomes effective in reference to clock signal 25. This impulse form information indicates the form of filtered bits and therefore gives more timing info on when the frequency of clock signal 25 changes. Temperature effect indicates to end macros 33 and 35, how much the frequency of clock signal 25 has changed as a result of temperature changes. Clock sensitivity on control word changes, which is also called sensitivity, as shown in FIG. 3 for instance, is the ratio between the frequency of clock signal 25 or local clock reference, and control bits, which may help end macros 33 and 35 estimate a more accurate frequency change from control bits.

Some parts of clock information 27', such as sensitivity and quality, may also be refined by providing feedback 37 from end macros 33 and 35 to macro 29. A global navigation satellite system (GNSS), for example, may be capable of generating very precise measurements on a clock signal when actively tracking several satellites. These precise measurements on the clock signal may thus be used to generate feedback from a GNSS end macro and sent to macro 29 for refining clock information 27' such as sensitivity and quality.

Figure 4:
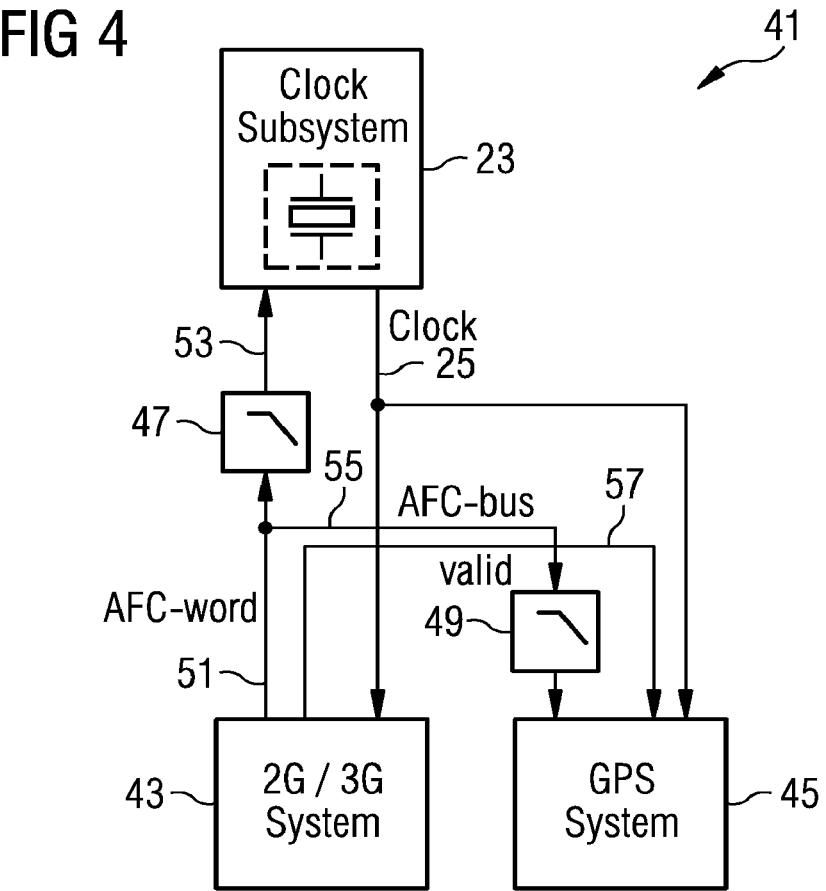
FIG. 4 is a circuit sharing a clock signal between a mobile communication network and a global navigation satellite system (GNSS) module, according to an aspect of the invention.

FIG. 4 is a clock distribution system, according to an aspect of the invention. A primary communication system, cellular 2G/3G macro 43, is driven by a voltage-controlled temperature-compensated crystal oscillator (VCTCXO) based clock subsystem 23. In addition to primary macro 43, mobile communication device 41 includes a secondary macro, global navigation satellite system (GNSS) macro 45. Macro 45 requires a temperature-compensated crystal oscillator (TCXO) equivalent clock subsystem.

During operation, macro 43 synchronizes clock subsystem 23 to an active remote base-station using an automatic frequency correction loop (AFC-loop). Since a GNSS system requires a stable reference clock, a clock that is changing its frequency due to a Doppler effect is generally insufficient.

In order to share a single reference clock, such as clock subsystem 23, between macros 43 and 45, automatic frequency correction bus (AFC-bus) 51 is included in mobile communication device 41. In operation, macro 43 generates auto frequency correction value (AFC-word) and distributes AFC-word on AFC-bus 51. AFC-word is applied to clock subsystem 23 through AFC-buses 51 and 53 by way of digital to analogue converter (DAC) 47. Similarly DAC 49 is employed on AFC-bus 55 prior to macro 45. A valid-impulse is also generated in tandem with AFC-word and is distributed on valid bus 57. Valid bus 57 allows for synchronizing macro 45 with the frequency correction applied to clock subsystem 23.

The change of clock subsystem 23 frequency is low-pass filtered using a digital filter within macro 43. Thus the transient behavior of the frequency change is accounted for within mobile communication device 41, and macro 45 includes a substantially identical digital filter. Thus, by employing the AFC-word and validity information from valid bus 57, a transient frequency is generated for every point in time. The transient frequency can then be used to counter the change of clock signal 25 which is used to synthesize the local frequency for macro 45. A similar approach may be used with a crystal oscillator plus negative temperature coefficient thermistor (XO+NTC) based clock subsystem. An alternative method may include having a fixed reference clock and shifting the local clock by tuning the phase-locked loop.

Figure 5:
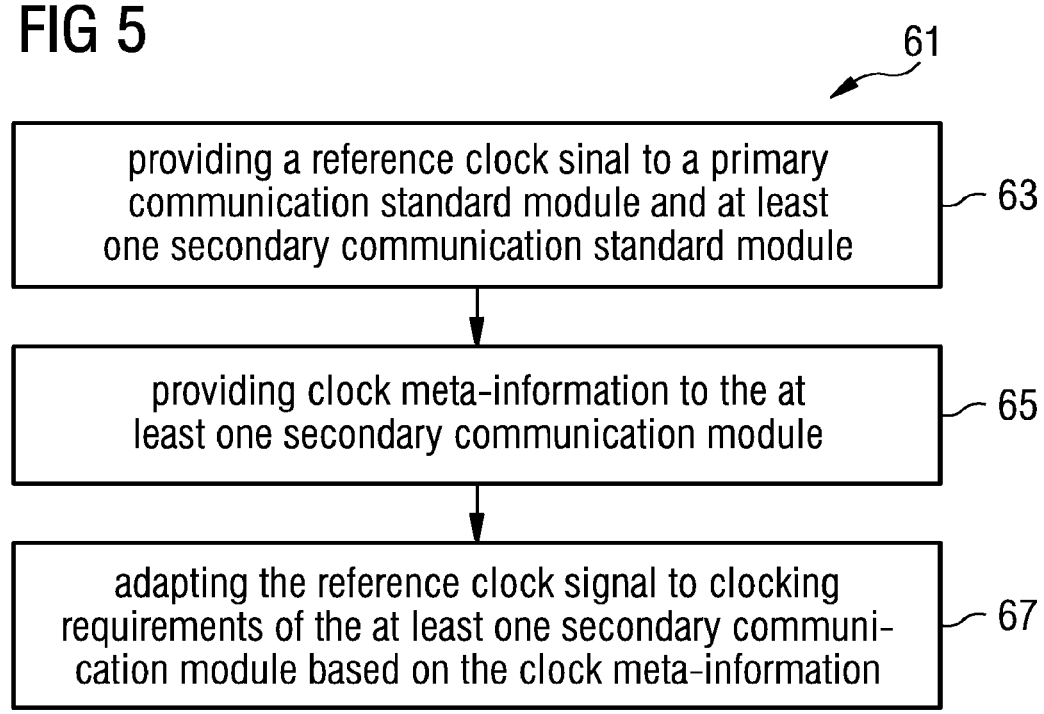
FIG. 5 shows a method for distributing a shared clock signal between multiple communication standards modules, according to an aspect of the invention.

FIG. 5 shows a method for distributing a shared clock signal between multiple communication standards modules, according to an aspect of the invention. In particular, method 61 is a method for distributing a shared clock signal between multiple communication standards modules. Method 61 includes providing a reference clock signal to a primary communication standard module and at least one secondary communication standard module 63, providing clock information to the at least one secondary communication module 65, and adapting the reference clock signal to clocking requirements of the at least one secondary communication module based on the clock information 67.

Method 63 may be carried out using some of the aspects of the disclosure provided above. For instance, in providing a reference clock signal to a primary communication standard module and at least one secondary communication standard module 63, clock subsystem 23 may be employed to provide, for instance, communication systems 7, 9, 11, 19 with clock signal 25.

Method 63 may further include synchronizing the reference clock signal to a base station in a mobile communication network. Providing a reference clock may include generating an oscillating signal with a voltage-controlled temperature-compensated crystal oscillator (VCTCXO) or a digitally controlled crystal oscillator (DCXO). Providing clock information may include providing a frequency correction value that should be applied with a digital to analog converter (DAC). Adapting the reference clock signal may include setting the frequency correction value of the digital to analog converter (DAC) and low-pass filtering the reference clock signal with a digital filter. The clock information may be used to dynamically adapt an algorithm used in at least one secondary module based on clock quality. Clock information may include at least one information item selected from the group consisting of: quality information, delay and validity information, impulse form information, temperature effect information, and sensitivity information.

A module may be a unit of distinct functionality that may be presented in software, hardware, or combinations thereof, including macros, systems, sub-systems, and interfacing circuitry. When the functionality of a module is performed in any part through software, the module includes a machine readable medium.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An integrated circuit comprising:
   a clock subsystem configured to provide a reference clock signal to a first module and a second module; and
   a circuit configured to distribute information describing characteristics of the reference clock signal to the second module,
   wherein the information distributed with the circuit enables the second module to adapt the reference clock signal based on the information and includes delay and validity information indicating when and whether the reference clock signal is valid and timing information on when a frequency of the reference clock signal changes.

2. The integrated circuit of claim 1, wherein the first module is a mobile communication standard configured to synchronize to a base station in a mobile communication network.

3. The integrated circuit of claim 2 wherein the first module is configured to be driven by a voltage-controlled temperature-compensated crystal oscillator (VCTCXO) grade clock signal and the second module is configured to be driven by a temperature-compensated crystal oscillator (TCXO) grade clock signal.

4. The integrated circuit of claim 1, wherein the second module includes a global navigation satellite system (GNSS) receiver.

5. The integrated circuit of claim 1, wherein the information is generated by the clock subsystem.

6. The integrated circuit of claim 1, wherein the information is generated by the first module.

7. The integrated circuit of claim 1, wherein an algorithm within the second module continuously adapts the second module based on clock quality provided in the information.

8. The integrated circuit of claim 1, wherein the clock subsystem is integrated into the first module.

9. The integrated circuit of claim 1, wherein the clock subsystem is a separate module.

10. A method for sharing a clock signal comprising:
    distributing a reference clock signal to a first module and a second module;
    distributing information to the second module describing characteristics of the reference clock signal and including delay and validity information indicating when and whether the reference clock signal is valid and timing information on when a frequency of the reference clock signal changes; and
    adapting the reference clock signal with the information to meet clocking requirements of the second module.

11. The method of claim 10, further comprising synchronizing the reference clock signal to a base station in a mobile communication network.

12. The method of claim 10,
    wherein the reference clock signal is generated with a oscillating signal from a voltage-controlled temperature-compensated crystal oscillator (VCTCXO) or a crystal oscillator (XO);
    wherein the information comprises a frequency correction value configured to adjust a digital to analog converter (DAC); and
    wherein adapting the reference clock signal comprises adjusting the digital to analog converter (DAC) with the frequency correction value of the information, and low-pass filtering the reference clock signal with a digital filter.

13. The method of claim 10, wherein an algorithm within the second module continuously adapts the second module based on clock quality provided in the information.

14. The method of claim 10, wherein the reference clock signal is generated within the first module.

15. The method of claim 10, wherein the reference clock signal is generated within separate clock subsystem module.

* * * * *